(12) United States Patent
Lukez et al.

(10) Patent No.: US 9,123,023 B2
(45) Date of Patent: Sep. 1, 2015

(54) CONFIGURABLE DOCUMENT GENERATOR TO PROVIDE DYNAMIC VIEWS OF USER DEFINED ELEMENTS

(75) Inventors: Rudolph Lukez, Highlands Ranch, CO (US); David Peake, Lakewood, CO (US)

(73) Assignee: Oracle International Corporation, Redwood Shores, CA (US)

( * ) Notice: Subject to any disclaimer, the term of this patent is extended or adjusted under 35 U.S.C. 154(b) by 164 days.

(21) Appl. No.: 13/403,176

(22) Filed: Feb. 23, 2012

(65) Prior Publication Data
US 2013/0226954 A1 Aug. 29, 2013

(51) Int. Cl.
*G06F 17/30* (2006.01)
*G06Q 10/10* (2012.01)

(52) U.S. Cl.
CPC .......... *G06Q 10/10* (2013.01); *G06F 17/30312* (2013.01); *G06F 17/30522* (2013.01)

(58) Field of Classification Search
CPC .............. G06Q 10/10; G06F 17/30312; G06F 17/30522
USPC .................................................. 707/769, 812
See application file for complete search history.

(56) References Cited

U.S. PATENT DOCUMENTS

| | | | |
|---|---|---|---|
| 6,959,416 B2 * | 10/2005 | Manning et al. | 715/227 |
| 7,114,149 B2 * | 9/2006 | Aptus et al. | 717/123 |
| 7,188,336 B2 * | 3/2007 | Humphries | 717/123 |
| 7,568,184 B1 * | 7/2009 | Roth | 717/123 |
| 7,788,640 B2 * | 8/2010 | Grimaldi | 717/123 |
| 2004/0073696 A1 * | 4/2004 | Kim | 709/232 |
| 2005/0216891 A1 * | 9/2005 | Sundararajan et al. | 717/123 |
| 2006/0059459 A1 * | 3/2006 | Grimaldi | 717/109 |
| 2006/0143275 A1 * | 6/2006 | Stephens et al. | 709/206 |
| 2008/0052297 A1 * | 2/2008 | LeClair | 707/100 |
| 2008/0198988 A1 * | 8/2008 | Book et al. | 379/114.28 |
| 2010/0114939 A1 * | 5/2010 | Schulman et al. | 707/769 |
| 2010/0174579 A1 * | 7/2010 | Hughes | 705/9 |

(Continued)

FOREIGN PATENT DOCUMENTS

WO   WO 2007113585 A1 * 10/2007

OTHER PUBLICATIONS

Dagenais, Barthélémy, et al., "Creating and Evolving Developer Documentation: Understanding the Decisions of Open Source Contributors", FSE-18, Santa Fe, New Mexico, Nov. 7-11, 2010, pp. 127-136.*
Koznov, D. V., et al., "DocLine: A Method for Software Product Lines Documentation Development", Programming and Computer Software, vol. 34, No. 4, © Pleiades Publishing, Ltd., © 2008, pp. 216-224.*
Kramer, Douglas, "API Documentation from Source Code Comments: A Case Study of Javadoc", SIGDOC '99, ACM, © 1999, pp. 147-153.*

(Continued)

*Primary Examiner* — Robert Stevens
(74) *Attorney, Agent, or Firm* — Kilpatrick Townsend & Stockton LLP

(57) ABSTRACT

Embodiments of the invention provide systems and methods for managing sets of structured data. According to one embodiment, managing a set of structured data can comprise identifying a plurality of elements within the set of structured data. Each of the identified elements can be assigned to a record having a predefined schema comprising content of the assigned element and a plurality of control attributes for the assigned element. One or more of the control attributes can be defined for each of the records and the records can be stored in a repository. Upon receiving a request for one or more of the plurality of elements, those elements to be made available can be identified based on the control attributes of the stored records. The stored records for the identified elements can be retrieved and provided to one or more users in response to the request.

19 Claims, 5 Drawing Sheets

(56) References Cited

U.S. PATENT DOCUMENTS

| | | | |
|---|---|---|---|
| 2011/0302195 A1* | 12/2011 | Cai et al. | 707/769 |
| 2012/0124092 A1* | 5/2012 | Teranishi et al. | 707/783 |
| 2012/0144448 A1* | 6/2012 | Gunawardena et al. | 726/1 |
| 2013/0046831 A1* | 2/2013 | Schultz et al. | 709/206 |

OTHER PUBLICATIONS

Leslie, Donald M., "Using Javadoc and XML to Produce API Reference Documentation", SIGDOC '02, Toronto, Ontario, Canada, Oct. 20-23, 2002, pp. 104-109.*

* cited by examiner

CONFIGURABLE DOCUMENT GENERATOR TO PROVIDE DYNAMIC VIEWS OF USER DEFINED ELEMENTS

BACKGROUND OF THE INVENTION

Embodiments of the present invention relate generally to methods and systems for managing sets of structured data such as documents and more particularly to managing common elements of structured data to provide for dynamic presentations of portions of the data.

Software applications continue to grow in size and scope. For example, applications such as enterprise applications, span a wide variety of different possible implementations and provide extensive and every increasing features and functionality. Accordingly, the documentation related to these applications continues to grow in volume. For example, information and associated images (e.g. screen shots, flow diagrams and table) related to a product releases is organized and assembled into lengthy, static documents distributed in PDF or other formats. These documents are occasionally updated and re-distributed to customers/users of the described application, regardless of products purchased or the features and/or functions being implemented by the individual customer/user.

However, since these documents are so extensive, they are cumbersome if not burdensome for the customers/users. For example, portions of a document describing a feature not implemented by a particular customer are not relevant to that customer. As a results, customers and users have been known to cut and paste the static document (either electronically or using paper/scissors/tape) to organize and utilize the content relevant to their needs. With the previous approaches, employees of the customer or software provider would have to generate individual items regarding the products and then the information would be assembled, edited and managed though several tiers of staff to prepare and eventually publish an approved document presented in one complete view of information (data). The process could take months if not a year. And, once the information was published a series of distribution methods had to be deployed to get the document to interested parties. There has not been an approach to handling such information or documentation in which information generation is dynamic and documents can be updated instantly. Hence, there is a need for improved methods and systems for managing sets of structured data such as documents.

BRIEF SUMMARY OF THE INVENTION

Embodiments of the invention provide systems and methods for managing sets of structured data. According to one embodiment, a method of managing a set of structured data can comprise identifying a plurality of elements within the set of structured data. Each of the identified elements can be assigned to a record having a predefined schema. The predefined schema of each record can comprise content of the assigned element and a plurality of control attributes for the assigned element. One or more of the control attributes can be defined for each of the records and the records can be stored in a repository. Upon receiving a request for one or more of the plurality of elements, those elements to be made available can be identified based on the control attributes of the stored records. The stored records for the identified elements can be retrieved and provided to one or more users in response to the request, e.g., through a user interface over a network such as a web page.

In some cases, the set of structured data can comprise one or more documents and the plurality of elements comprise portions of the one or more documents having a same structure. For example, the one or more documents can include one or more of a user's guide for an application, a programmer's guide for an application, or a series of documents related to development of an application. In such cases, the control attributes can include, but are not limited to, one or more of a release attribute identifying a release or version of the application to which the document relates, a set of component attributes identifying a context for the document, or a status attribute identifying a current status of the document or application. Additionally or alternatively, the content of at least one record can comprise an attachment or a hyperlink.

In some cases, the control attributes can further include at least one access control attribute. In such cases, providing the retrieved records in response to the request can be based at least in part on the access control attribute. In such cases, identifying elements to be made available based on the control attributes of the stored records can comprise identifying records having control attributes matching the search criteria. Receiving the request for one or more of the plurality of elements can comprise receiving a query including search criteria. A plurality of such received queries and results of identifying, retrieving, providing of records, may be tracked and, in such cases, one or more reports can be generated based on said tracking. Additionally or alternatively, providing the retrieved records can comprise assembling the retrieved records into a document and providing the assembled document.

According to another embodiment, a system can comprise a processor and a memory communicatively coupled with and readable by the processor. The memory can have stored therein a sequence of instructions which, when executed by the processor, causes the processor to manage a set of structured data by identifying a plurality of elements within the set of structured data. Each of the identified elements can be assigned to a record having a predefined schema. The predefined schema of each record can comprise content of the assigned element and a plurality of control attributes for the assigned element. One or more of the control attributes can be defined for each of the records and the records can be stored in a repository. Upon receiving a request for one or more of the plurality of elements, those elements to be made available can be identified based on the control attributes of the stored records. The stored records for the identified elements can be retrieved and provided to one or more users in response to the request, e.g., through a user interface over a network such as a web page.

According to yet another embodiment, a computer-readable memory can have stored thereon a sequence of instructions which, when executed by the processor, causes the processor to manage a set of structured data by identifying a plurality of elements within the set of structured data. Each of the identified elements can be assigned to a record having a predefined schema. The predefined schema of each record can comprise content of the assigned element and a plurality of control attributes for the assigned element. One or more of the control attributes can be defined for each of the records and the records can be stored in a repository. Upon receiving a request for one or more of the plurality of elements, those elements to be made available can be identified based on the control attributes of the stored records. The stored records for the identified elements can be retrieved and provided to one or more users in response to the request, e.g., through a user interface over a network such as a web page.

DETAILED DESCRIPTION OF THE INVENTION

Figure 1:
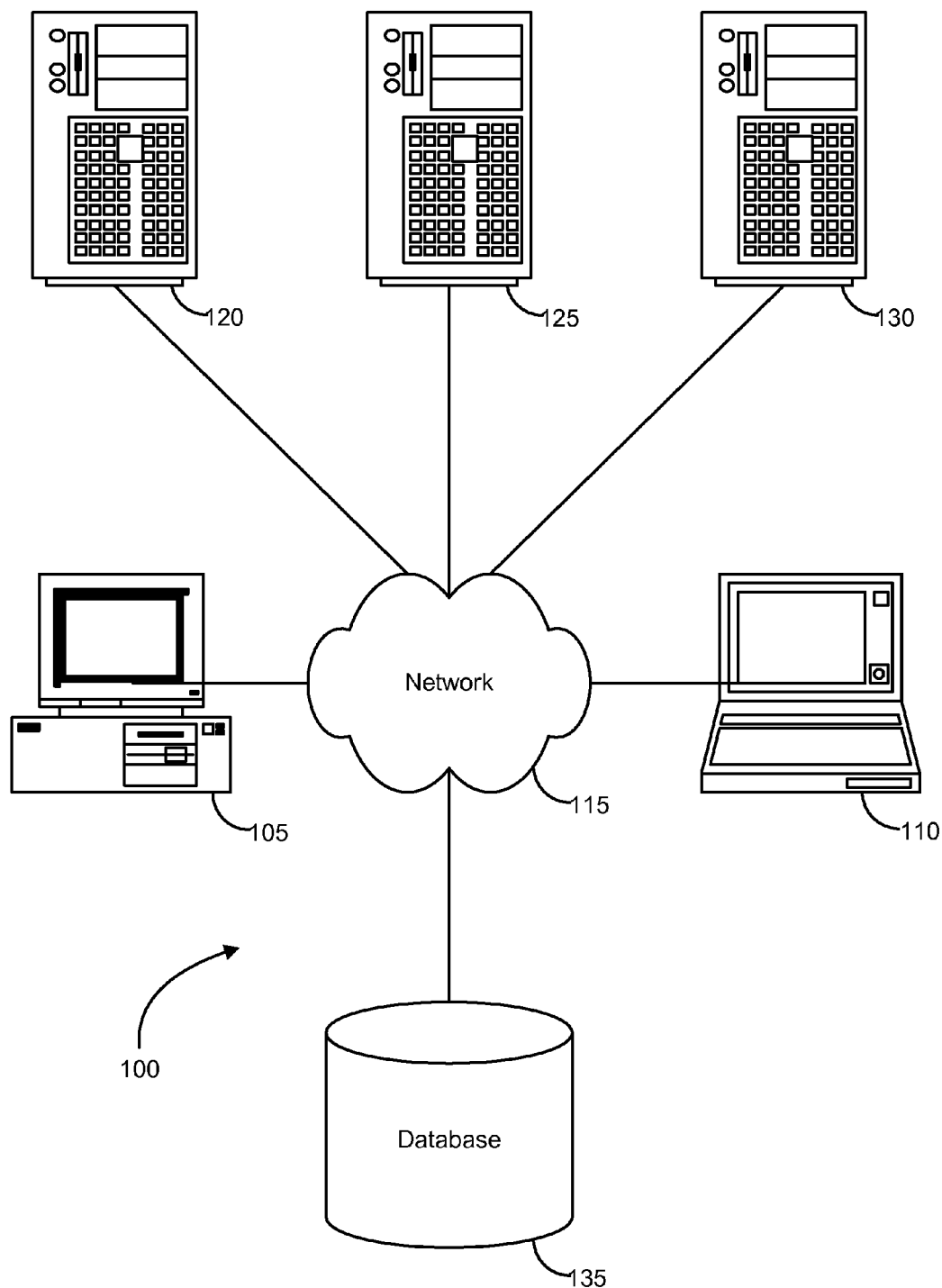
FIG. 1 is a block diagram illustrating components of an exemplary operating environment in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to, portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention provide systems and methods for managing sets of structured data. More specifically, embodiments of the present invention provide for moving away from a static view of the data, e.g., a static document, to a dynamic view of the contents based on a user's needs or interests, e.g., the products, releases, features, etc., of an application as implemented by that user. Permits end users to select, order and otherwise configure broad document information related to products (e.g. features, releases, net-change) and present configured information specific to end user needs in highly readable report formats. Likewise, administrators of the information can update data in real time. Various additional details of embodiments of the present invention will be described below with reference to the figures.

FIG. 1 is a block diagram illustrating components of an exemplary operating environment in which various embodiments of the present invention may be implemented. The system 100 can include one or more user computers 105, 110, which may be used to operate a client, whether a dedicate application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network can be any type of network familiar to those skilled in the art that can support data communications using any of a variety of commercially-available protocols, including without limitation TCP/IP, SNA, IPX, AppleTalk, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
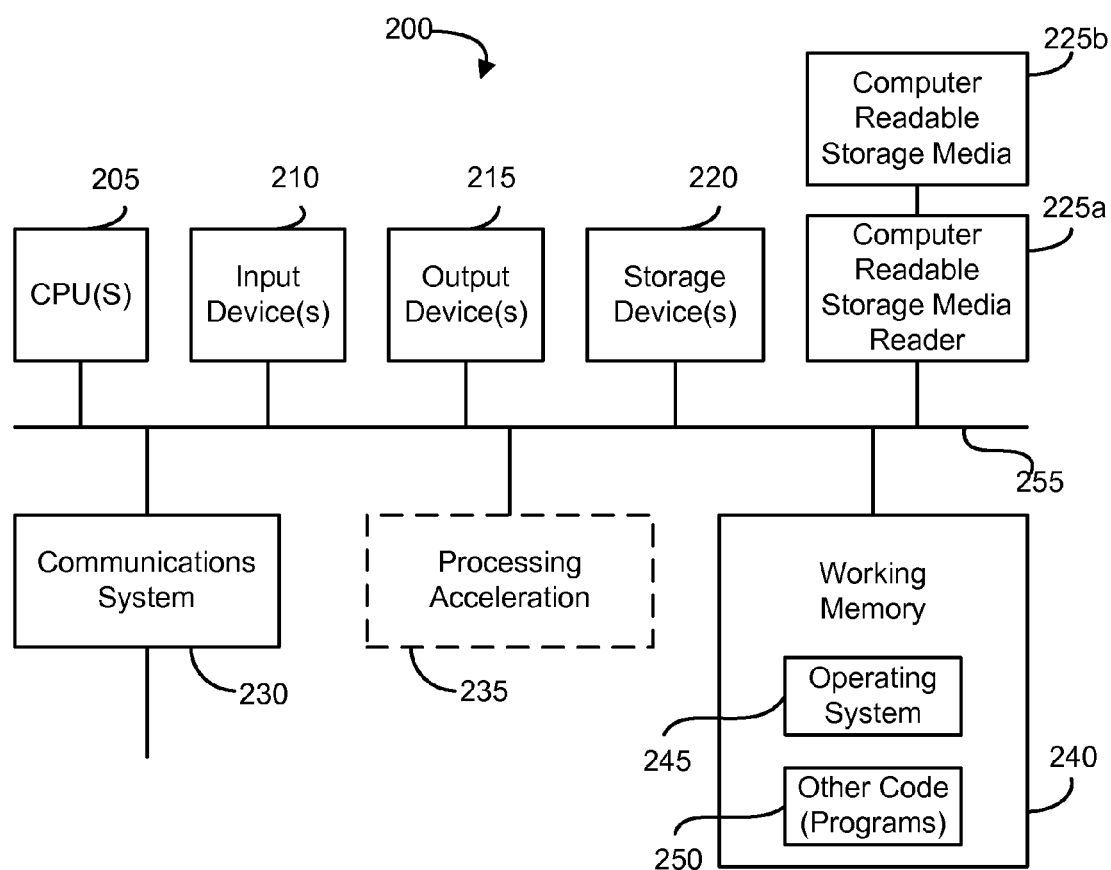
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

Figure 3:
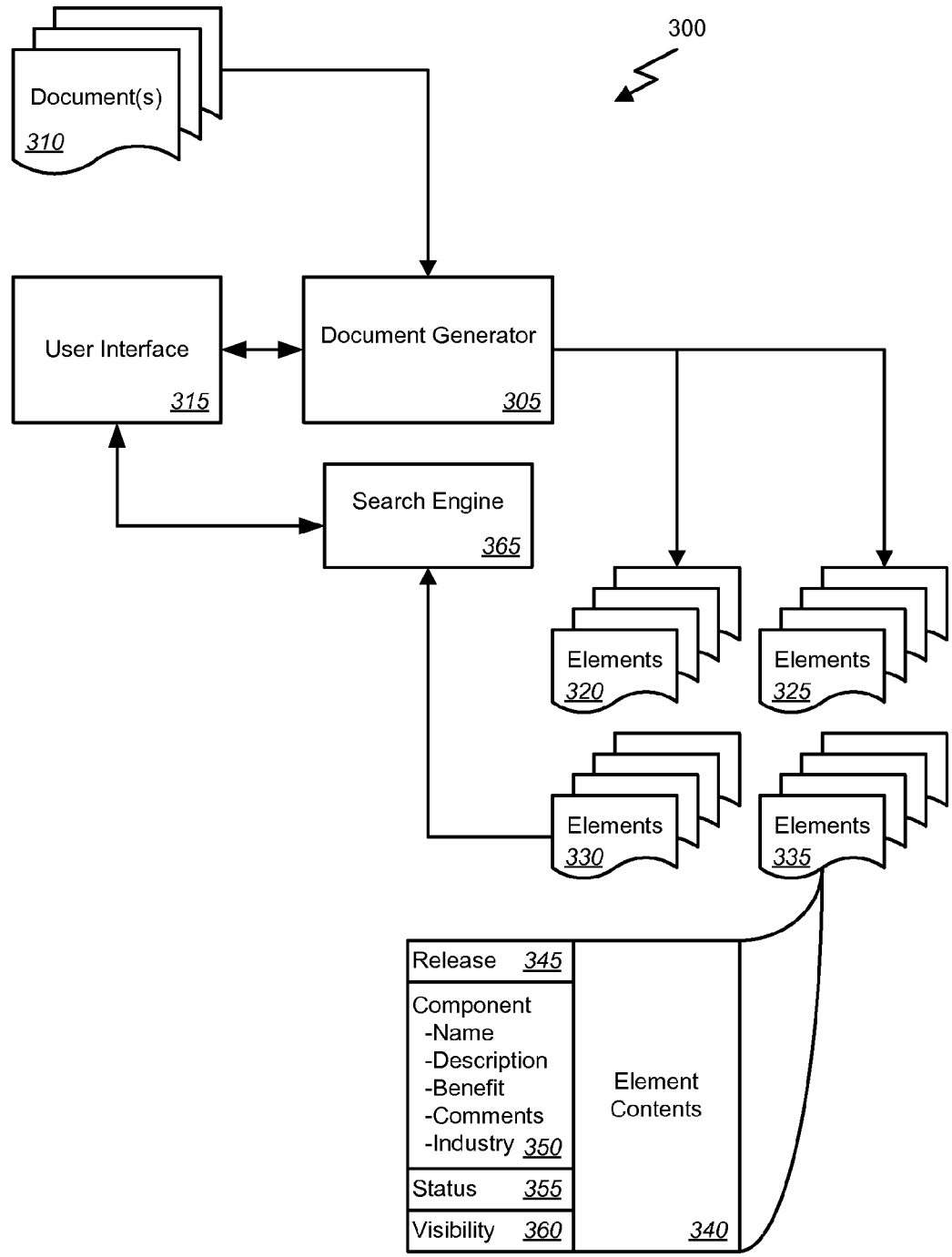
FIG. 3 is a block diagram illustrating, at a high-level, functional components of a system for managing sets of structured data according to one embodiment of the present invention.

FIG. 3 is a block diagram illustrating, at a high-level, functional components of a system for managing sets of structured data according to one embodiment of the present invention. In this example, a system 300 such as any of the computer systems described above, can execute a document generator 305. Generally speaking, the document generator 305 can provide a dynamic view of the contents of a data set. More specifically, the document generator 305 can read a data set such as a set of one or more documents 315. The document generator 305 can also receive user input through a user interface 315 to define and/or identify contents of the data set. For example, through the user interface 315, a user can interact with the document generator 305 and cause the document generator to read a document 310 or portions of a document.

The document generator 305 can then identify portions of the data set, e.g., portions of the documents 310 and/or data provided through the user interface 315, as elements 320-335 to be represented and made available to users. That is, portions or elements 320-335 within the documents 310 or data set having similar structure and which will be available for representation to users can be identified. Each of these elements 320-335 can be assigned to a record having a predefined schema. For example, these elements 320-335 can be assigned to records of a table to be stored in a repository (not shown here) such as a database. According to one embodiment, The predefined schema of each record can comprise element contents 340 of the assigned element and a plurality of control attributes 345-360 for the assigned element. The element contents 340 can comprise, for example, text of portions of the documents 310 or other contents such as figures, charts, graphs, etc. In some cases, the content of a record can include an attachment or a hyperlink. The control attributes 345-360 can be assigned, for example by a user through the user interface 315, based on the individual element contents 340 for that element. The attributes 345-360 can include, but are not limited to, a release attribute 345 identifying a release or version of the application to which the document relates and/or a set of component attributes 350 identifying a context for the document. For example, the component attributes can comprise one or more of a name, a description, a statement of a benefit of a particular function or feature to which the element contents 340 relate, comments or notes describing the feature or function to which the element contents 340 relate, an industry or field to which the function or feature to which the element contents 340 relate is applicable, etc. The control attribute can additionally or alternatively include a status attribute 355 identifying a current status of the document or application to which the element relates. For example, the status attribute 355 can identify a function or feature to which the element contents 340 relate as being planned, available, canceled, etc. The control attribute can additionally or alternatively include one or more access control attributes 360. For example, the access control attributes 360 can comprise a visibility attribute identifying the element contents as public or private, or available only to particular users, groups of users, etc.

The system 300 can also execute a search engine 365 or other element through which a user, e.g., through the user interface 315 can request and retrieve stored elements 320-335 representing the data set. More specifically, the search engine 365 can receive from the user interface 315 a query or other request identifying criteria for which particular elements 320-335 should be retrieved. The search engine 365 can identify elements having control attributes matching the search criteria, retrieve those elements, and, if permitted by the control attributes, provide the matching, retrieved elements to the user for a dynamic view relevant to that particular user.

So for example, documents 310 represented can include but are not limited to a user's guide for an enterprise or other application, a programmer's guide for such an application, and/or other documentation related to the development of such an application such as a Statement of Direction (SOD), Preliminary Release Notes (PRN), Release Notes (RN), a Release Value Proposition (RVP), an Upgrade Value Proposition (UVP), and or other such documents. Once elements of these documents have been identified and stored in the predefined schema with proper controlling attributes, they can be made available, for example thought user interface 315 provided by a web server, as a searchable, dynamic version of the documents. Thus, in one implementation, an original user's guide can be stored as a set of elements 320-335 having control attributes 345-360 identifying the release 345, component 350, status 355, visibility 360, etc. to which each function or feature of the individual elements 320-335 relate. A user of the web service can then search for function or features relevant to that particular user. In this way, the user can receive a dynamic view of the document for a particular implementation of the application.

In some cases, the retrieved elements can be assembled into a complete document and provided to the user, e.g., as a PDF or other format document ready for printing or electronic distribution and having a uniform format, style, etc. When assembling the retrieved elements into a complete document, there are multiple ways to order the elements. For example, elements can be ordered by traditional, straight alphanumerical methods or forced into an order using an assigned value. Based on the attributes 345, 350, 355, 360, element contents 340, the ordering, and/or filtering, the generated documents can include, for example, output structures with predefined content, variable fields automatically calculated such as page numbers and time stamps, and/or user options to complete fields related to the output including a document title, customer name, and user. This data may also be defined as mandatory or optional for a particular document, set of documents or all documents. The data can be tagged for search and tag cloud processing and display providing an additional vehicle for dynamic document generation can be presented in a hierarchical structure based on the content, attributes, etc.

It should be noted that, while described herein as implemented with or on a set of documents, such as a programmer guide, user guide, etc., for an enterprise application, embodiments of the present invention should not be considered to be limited to such implementations. Rather, embodiments of the present invention are thought to be equally applicable to other implementations in which a large set of structured data having common elements which can be assigned to a predefined schema having a set of control attributes. Such other implementations are contemplated and considered to be within the scope of the present invention. Thus, embodiments of the invention provide for handling a wide variety of data for any product based on an assembly of different components which individually can change and have different availabilities. As these data items change information for the whole product at any given instant of time can be generated, and from that generation of information a complete data view of the product is presented to an end user. Additionally or alternatively, data elements can be bulk loaded so that future data set expansion can be defined, edited and loaded quickly.

Stated another way, managing a set of structured data can begin with the document generator 305 reading a set of structured data. Reading the set of structured data can comprise reading an existing set, such as one or more existing documents 310 and/or associated content, receiving user input through the user interface 315 identifying or defining the data, and/or some combination thereof. The set of structured data can comprise, for example, one or more documents 310 and the plurality of elements can comprise portions of the one or more documents having a same structure. In some implementations, the one or more documents 310 can include one or more of a user's guide for an application, a programmer's guide for an application, or a series of documents related to development of an application.

Once received by the document generator 305, a plurality of elements within the set of structured data can be identified, e.g., based on a user input from the user interface 315 and/or some analysis of the data set by the document generator 305, etc. Each of the identified elements 320-335 can be assigned to a record having a predefined schema. The predefined schema of each record can comprise content 340 of the assigned element and a plurality of control attributes 345-360 for the assigned element. In some cases, the content 340 of a record can include an attachment or a hyperlink.

One or more of the control attributes 345-360 can be defined by the document generator 305 for each of the records, for example based on user input through the user interface 315. The control attributes can include, but are not limited to, one or more of a release attribute 345 identifying a release or version of the application to which the document relates, a set of component attributes 350 identifying a context for the document, or a status 355 attribute identifying a current status of the document or application. The records with the content and control attributes can be stored by the document generator in a repository, e.g., as records of a table and according to the predefined schema.

A request for one or more of the plurality of elements 320-335 may then be received by the document generator 305 and/or search engine 365. For example, receiving the request for one or more of the plurality of elements can comprise receiving a query including search criteria. Elements 320-335 to be made available can be identified based on the control attributes of the stored records. For example, identifying elements to be made available can be performed by the search engine 365 based on the control attributes of the stored records by identifying records having control attributes matching the search criteria.

The stored records for the identified elements can be retrieved by the search engine 365 and/or document generator 305 and provided in response to the request through the user interface 315. For example, providing the retrieved records can comprise displaying the retrieved records through a web page. Additionally or alternatively, providing the retrieved records can comprise assembling the retrieved records into a document by the document generator 305 and providing the assembled document as a complete document. In some cases, the control attributes 345-360 can further include at least one access control attribute 360. In such cases, providing the retrieved records by the search engine 365 and/or document generator 305 in response to the request can be based at least in part on the access control attribute 360. Additionally or alternatively, a plurality of received queries or requests and results thereof, i.e., results of identifying, retrieving, and providing of records, can be tracked and one or more reports can be generated based on said tracking.

Management or administration of the data using embodiments of the invention permits different types of roles and each role can offer a different level of security and responsibility, for example, based on the visibility attribute 360 and/or other attributes. For example, one role could be called an "administrator" with responsibilities that include large scale data deletion. Another role may be "contributor" which would not have delete abilities but could add and update data. Access to the information can be controlled by setting the visibility attribute 360 and/or another variable for permissible viewing to different audiences. For example, the flag could simply offer only a "yes" or "no" binary switch that when set to "yes" makes information visible electronically to all users with system access. Likewise, a "no" setting would prevent general users from seeing the data.

Using embodiments of the present invention, an entire data set, or any portion thereof, can be managed live even when actively accessed by users and groups. Management may include creation, updates, and deletion. This also permits multiple data creators and editors to access the primary data set (not only individual items) simultaneously for editing and provides uniform data entry and completion. The infrastructure can be leveraged for multiple dynamic document structures in which only a small portion of data is shared or leveraged between 2 or more document generators.

Figure 4:
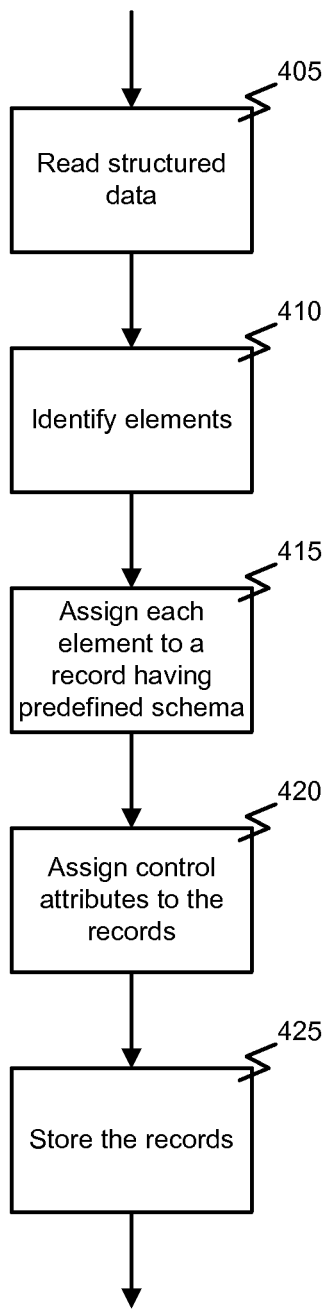
FIG. 4 is a flowchart illustrating a process for generating data set elements according to one embodiment of the present invention.

FIG. 4 is a flowchart illustrating a process for generating data set elements according to one embodiment of the present invention. As illustrated in this example, managing a set of structured data can begin with reading 405 a set of structured data. As noted above, reading 405 the set of structured data can comprise reading an existing set, such as one or more existing documents and/or associated content, receiving user input identifying or defining the data, and/or some combination thereof. The set of structured data can comprise, for example, one or more documents and the plurality of elements can comprise portions of the one or more documents having a same structure. In some implementations, the one or more documents can include one or more of a user's guide for an application, a programmer's guide for an application, or a series of documents related to development of an application.

Once received or read, a plurality of elements within the set of structured data can be identified 410, e.g., based on a user input and/or some analysis of the data set, etc. Each of the identified elements can be assigned 415 to a record having a predefined schema. The predefined schema of each record can comprise content of the assigned element and a plurality of control attributes for the assigned element. In some cases, the content of a record can include an attachment or a hyperlink.

One or more of the control attributes can be defined 420 for each of the records. The control attributes can include, but are not limited to, one or more of a release attribute identifying a release or version of the application to which the document relates, a set of component attributes identifying a context for the document, or a status attribute identifying a current status of the document or application. The records with the content and control attributes can be stored 425 in a repository, e.g., as records of a table and according to the predefined schema, and made available for use such as described below with reference to FIG. 5.

Figure 5:
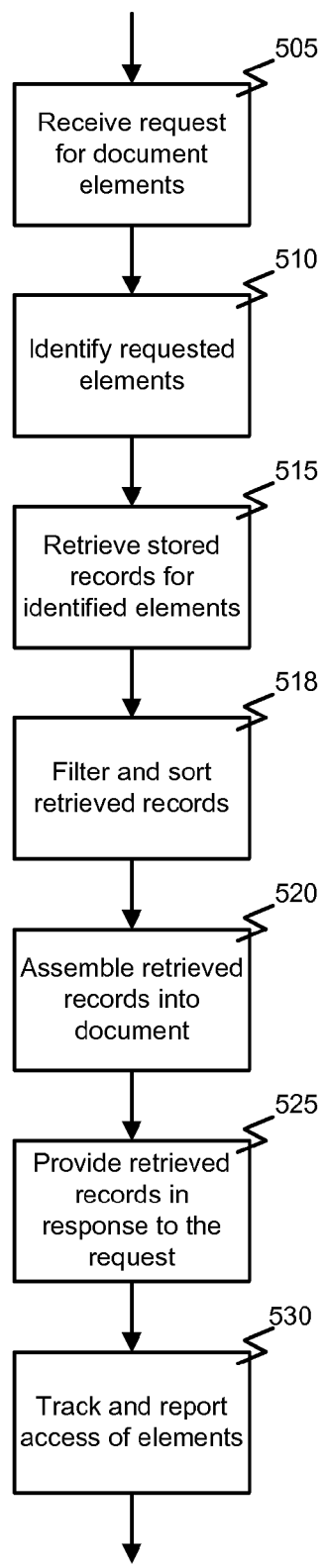
FIG. 5 is a flowchart illustrating a process for using generated data set elements according to one embodiment of the present invention.

FIG. 5 is a flowchart illustrating a process for using generated data set elements according to one embodiment of the present invention. In this example, the process can begin with receiving 505 a request for one or more of the plurality of elements. For example, receiving 505 the request for one or more of the plurality of elements can comprise receiving a query including search criteria. Elements to be made available can be identified 510 based on the control attributes of the stored records. For example, identifying 510 elements to be made available based on the control attributes of the stored records can comprise identifying records having control attributes matching the search criteria.

The stored records for the identified elements can be retrieved 515 and provided 525 in response to the request. For example, providing 525 the retrieved records can comprise displaying the retrieved records through a web page. Additionally or alternatively, providing 525 the retrieved records can comprise assembling 520 the retrieved records into a document and providing the assembled document. Additionally or alternatively, providing 525 the retrieved records can comprise filtering and sorting the retrieved records, for example based on the attributes and a set of rules or conditions. In some cases, the control attributes can further include at least one access control attribute. In such cases, providing 525 the retrieved records in response to the request can be based at least in part on the access control attribute. Additionally or alternatively, a plurality of received queries or requests and results thereof, i.e., results of identifying, retrieving, and providing of records, can be tracked 530 and one or more reports can be generated based on said tracking.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method of managing a set of structured data, the method comprising:
    identifying, by a computer system, a plurality of elements within the set of structured data, wherein the set of structured data comprises one or more documents, wherein the plurality of elements comprise portions of the one or more documents having a same structure, and wherein the one or more documents include one or more of a user's guide for an application, a programmer's guide for an application, or a series of documents related to development of an application;
    assigning, by the computer system, each of the plurality of identified elements to a record having a predefined schema, the predefined schema of each record comprising content of an element assigned to the record and a plurality of user defined control attributes describing and controlling the content of the element assigned to the record, wherein the control attributes for each record include a release attribute identifying a release or version of the application to which the document relates, a set of component attributes identifying a context for the document, a status attribute identifying past, current, or future availability of a function or feature of the application to which the element relates, and at least one user defined access control attribute defining role-based permissions to the content of the record;
    defining, by the computer system, for each of the records one or more of the control attributes;
    storing, by the computer system, the records in a repository; and
    providing a dynamic view of one or more of the records in the repository based on the control attributes.

2. The method of claim 1, wherein providing the dynamic view of the one or more of the records in the repository based on the control attributes comprises:
    receiving, by the computer system, a request for one or more of the plurality of elements;
    identifying, by the computer system, elements to be made available based on the request and the control attributes of the stored records;
    retrieving, by the computer system, the stored records for the identified elements to be made available; and
    providing, by the computer system, the retrieved records in response to the request through a user interface, the user interface provided to one or more users over a network.

3. The method of claim 2, wherein receiving the request for one or more of the plurality of elements comprising receiving a query including search criteria and wherein identifying elements to be made available based on the control attributes of the stored records comprises identifying records having control attributes matching the search criteria.

4. The method of claim 3, further comprising tracking a plurality of received queries and results of identifying, retrieving, and providing of records, and generating one or more reports based on said tracking.

5. The method of claim 2, wherein providing the retrieved records comprises displaying the retrieved records through a web page.

6. The method of claim 2, wherein providing the retrieved records comprises assembling the retrieved records into a document and providing the assembled document.

7. The method of claim 1, wherein the content of at least one record comprises an attachment or a hyperlink.

8. The method of claim 1, wherein providing the retrieved records in response to the request is based at least in part on the access control attribute.

9. The method of claim 1, wherein status attribute identifies a function or feature to which the element contents relate as being one of planned, available, or canceled.

10. A system comprising:
    a processor; and
    a memory communicatively coupled with and readable by the processor and having stored therein a sequence of instructions which, when executed by the processor, causes the processor to manage a set of structured data by identifying a plurality of elements within the set of structured data, wherein the set of structured data comprises one or more documents, wherein the plurality of elements comprise portions of the one or more documents having a same structure, and wherein the one or more documents include one or more of a user's guide for an application, a programmer's guide for an application, or a series of documents related to development of an application, assigning each of the identified plurality of elements to a record having a predefined schema, the predefined schema of each record comprising content of an element assigned to the record and a plurality of user defined control attributes describing and controlling the element assigned to the record, wherein the control attributes for each record include a release attribute identifying a release or version of the application to which the document relates, a set of component attributes identifying a context for the document, a status attribute identifying past, current, or future availability of a function or feature of the application to which the element relates, and at least one user defined access control attribute defining role-based permissions to the content of the record, defining for each of the records one or more of the control attributes, storing the records in a repository, receiving a request for one or more of the plurality of elements, identifying elements to be made available based on the request and the control attributes of the stored records, retrieving the stored records for the identified elements, and providing a dynamic view of the retrieved records in response to the request through a user interface based on the control attributes, the user interface provided to one or more users over a network.

11. The system of claim 10 wherein providing the retrieved records in response to the request is based at least in part on the access control attribute.

12. The system of claim 10, wherein receiving the request for one or more of the plurality of elements comprising receiving a query including search criteria and wherein identifying elements to be made available based on the control attributes of the stored records comprises identifying records having control attributes matching the search criteria.

13. The system of claim 10, wherein status attribute identifies a function or feature to which the element contents relate as being one of planned, available, or canceled.

14. A non-transitory computer-readable memory device having stored thereon a sequence of instructions which, when executed by the processor, cause the processor to manage a set of structured data by:
   identifying a plurality of elements within the set of structured data, wherein the set of structured data comprises one or more documents, wherein the plurality of elements comprise portions of the one or more documents having a same structure, and wherein the one or more documents include one or more of a user's guide for an application, a programmer's guide for an application, or a series of documents related to development of an application;
   assigning each of the identified plurality of elements to a record having a predefined schema, the predefined schema of each record comprising content of an element assigned to the record and a plurality of user defined control attributes describing and controlling the element assigned to the record, wherein the control attributes for each record include a release attribute identifying a release or version of the application to which the document relates, a set of component attributes identifying a context for the document, a status attribute identifying past, current, or future availability of a function or feature of the application to which the element relates, and at least one user defined access control attribute defining role-based permissions to the content of the record;
   defining for each of the records one or more of the control attributes; and
   storing the records in a repository;
   receiving a request for one or more of the plurality of elements;
   identifying elements to be made available based on the request and the control attributes of the stored records;
   retrieving the stored records for the identified elements; and
   providing a dynamic view of the retrieved records in response to the request through a user interface based on the control attributes, the user interface provided to one or more users over a network.

15. The non-transitory computer-readable memory device of claim 14 wherein providing the retrieved records in response to the request is based at least in part on the access control attribute.

16. The non-transitory computer-readable memory device of claim 14, wherein receiving the request for one or more of the plurality of elements comprising receiving a query including search criteria and wherein identifying elements to be made available based on the control attributes of the stored records comprises identifying records having control attributes matching the search criteria.

17. The non-transitory computer-readable memory device of claim 16, further comprising tracking a plurality of received queries and results of identifying, retrieving, and providing of records, and generating one or more reports based on said tracking.

18. The non-transitory computer-readable memory device of claim 14, wherein providing the retrieved records comprises assembling the retrieved records into a document and providing the assembled document.

19. The non-transitory computer-readable memory of claim 14, wherein status attribute identifies a function or feature to which the element contents relate as being one of planned, available, or canceled.

* * * * *